UNITED STATES PATENT OFFICE.

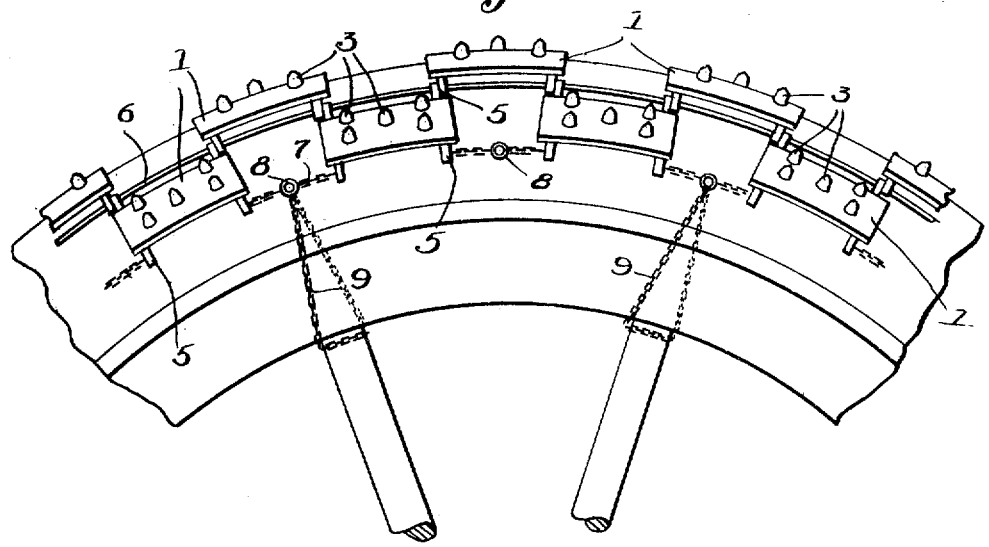
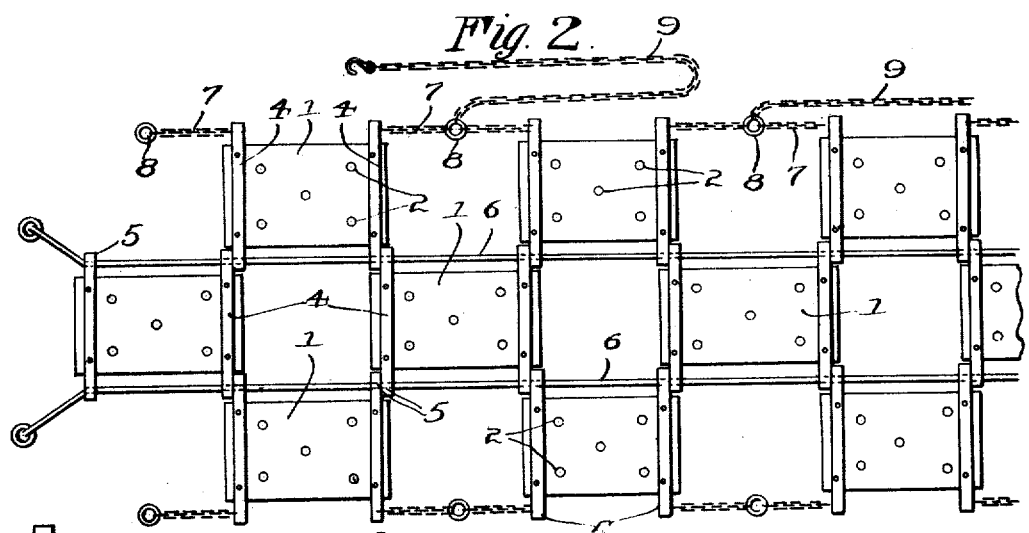
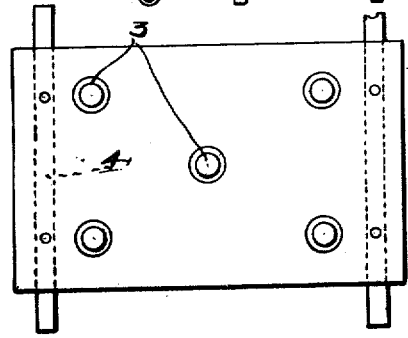

ALEX LEHOCZKY, OF DETROIT, MICHIGAN.

NON-SKID TIRE-ARMOR.

1,355,056.　　　　　Specification of Letters Patent.　　　Patented Oct. 5, 1920.

Application filed August 10, 1918. Serial No. 249,317.

*To all whom it may concern:*

Be it known that I, ALEX LEHOCZKY, a citizen of Hungary, residing at Detroit, in the county of Wayne and State of Michigan, have invented new and useful Improvements in Non-Skid Tire-Armors, of which the following is a specification.

This invention relates to tire armors and it consists in the novel features hereinafter described and claimed.

An object of the invention is to provide an armor of simple and durable structure adapted to be applied to the wheel of an automobile and when applied adapted to prevent the wheel from slipping or skidding.

With this object in view the armor comprises a series of plates each provided with studs, the said plates being provided at their corner portions with eyes. A cable is threaded through the eyes of the adjacent plates and is adapted to pass around the tire of the wheel. The ends of the said cables are adapted to be connected together by any suitable means. The eyes of the plates at the outer portions of the armor are connected together by chain sections and securing chains may be connected with the said chain sections and pass around the spokes and felly of the wheel whereby the armor is held in position upon the wheel.

In the accompanying drawing:—

Figure 1 is a side view of a wheel with the armor applied.

Fig. 2 is a bottom plan view of the protector for the tire.

Fig. 3 is a transverse sectional view through one of the plates of the armor.

Fig. 4 is an enlarged plan view of said plate.

The armor comprises a series of plates 1 which are preferably formed from sheet metal and may conform to the general curvature of the exterior of the tire of an automobile wheel. Each plate is provided with a series of threaded openings 2 which are adapted to receive the shanks of studs 3. The studs 3 are disposed at the outer sides of the plate.

In one form of the invention the plate is provided at its opposite ends with a cross bar 4 and the ends of each bar are fashioned into eyes 5 and the eyes are located at the corner portion of the plate. In the event that the plates are relatively large the eyes may be formed integrally at the corner portions of the plate and cross bars 4 may be dispensed with.

When the plates are assembled in the form of an armor they are arranged in checkered fashion whereby the eyes at the intermediate portion of the armor are brought into alinement with each other. Cables 6 are threaded through the alined eyes 5 and the ends of the said cables may be secured together by any suitable means. The cables 6 are adapted to extend around the periphery of the tire and serve as means for holding the intermediate portion of the armor in position upon the tire. Chain sections 7 are connected with the eyes of the plate at the outer portions of the armor and the chain sections 7 are provided at points between their ends with relatively large links 8 with which chains 9 are connected. The chains 9 are adapted to be passed around the spokes of the wheel and the felly thereof whereby the side portions of the armor are held in position upon the periphery of the tire.

From the foregoing description taken in conjunction with the accompanying drawing, it will be seen that a tire armor of simple structure is provided and that the same may be used to effectually prevent slipping or skidding of the wheel.

Having described the invention what is claimed is:—

A tire armor comprising a plurality of rectangular plates elongated circumferentially of the tire, a cross bar arranged upon the under side of each plate adjacent each end, each cross bar projecting beyond the opposite longitudinal edges of its associated plate and terminating to provide eyes, the plates at the intermediate portion of the armor having their eyes alined, cables passing through the alined eyes and having their ends detachably connected together, and chain sections connecting the eyes of the outer portion of the armor together.

In testimony whereof I affix my signature.

ALEX LEHOCZKY.